US006834211B1

United States Patent
Coss, Jr. et al.

(10) Patent No.: US 6,834,211 B1
(45) Date of Patent: Dec. 21, 2004

(54) ADJUSTING A TRACE DATA RATE BASED UPON A TOOL STATE

(75) Inventors: Elfido Coss, Jr., Austin, TX (US); Brian K. Cusson, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 73 days.

(21) Appl. No.: 10/284,639

(22) Filed: Oct. 31, 2002

(51) Int. Cl.[7] .............................................. G06F 19/00
(52) U.S. Cl. ........................ 700/108; 700/121; 702/83
(58) Field of Search ................................ 700/108, 121; 702/81, 83

(56) References Cited

U.S. PATENT DOCUMENTS

| | | | | |
|---|---|---|---|---|
| 5,859,964 A | * | 1/1999 | Wang et al. | 714/48 |
| 5,991,470 A | * | 11/1999 | Swithers et al. | 382/322 |
| 6,002,996 A | * | 12/1999 | Burks et al. | 702/188 |
| 6,392,584 B1 | * | 5/2002 | Eklund | 341/183 |
| 2002/0183949 A1 | * | 12/2002 | Chen et al. | 702/83 |
| 2003/0154056 A1 | * | 8/2003 | Ito et al. | 702/188 |
| 2004/0054494 A1 | * | 3/2004 | El-Khashab | 702/127 |

* cited by examiner

Primary Examiner—Leo Picard
Assistant Examiner—Elliot Frank
(74) Attorney, Agent, or Firm—Williams, Morgan & Amerson, P.C.

(57) ABSTRACT

A method and an apparatus for adjusting a rate of data flow based upon a tool state. A processing step is performed on a workpiece using a processing tool. A dynamic data rate adjustment process is performed to determine a data rate for acquiring data relating to the process performed upon the workpiece. The dynamic data rate adjustment process includes adjusting the data rate based upon an operation parameter relating to the processing tool.

32 Claims, 8 Drawing Sheets

ADJUSTING A TRACE DATA RATE BASED UPON A TOOL STATE

BACKGROUND OF THE INVENTION

1. Field of the Invention

This invention relates generally to semiconductor manufacturing, and, more particularly, to a method and apparatus for adjusting the rate of data flow based upon tool state(s).

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using the patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

Figure 1:
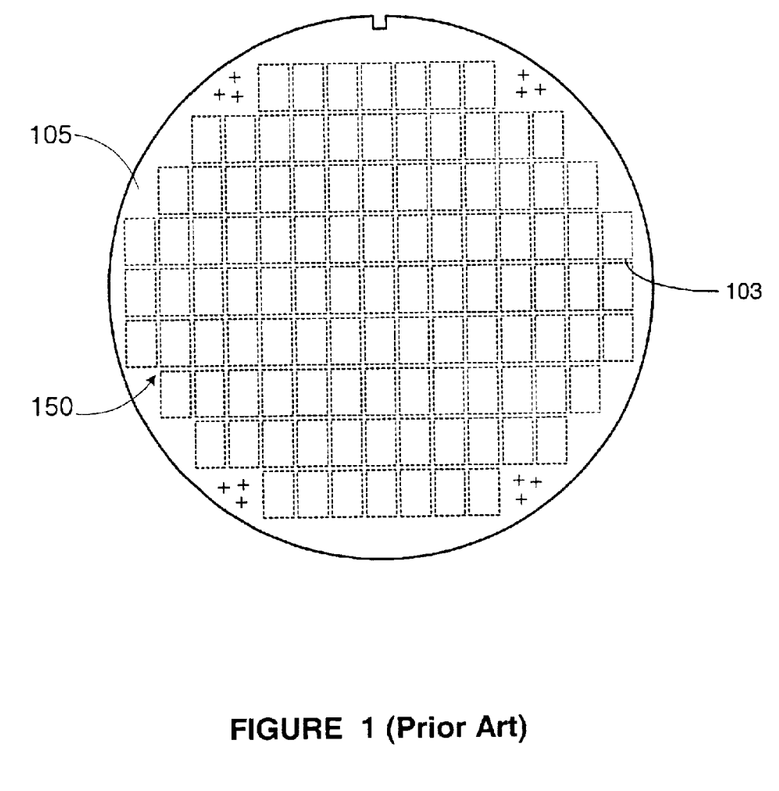
FIG. 1 is a simplified diagram of a prior art semiconductor wafer being processed.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on approximately one to four die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

Figure 2:
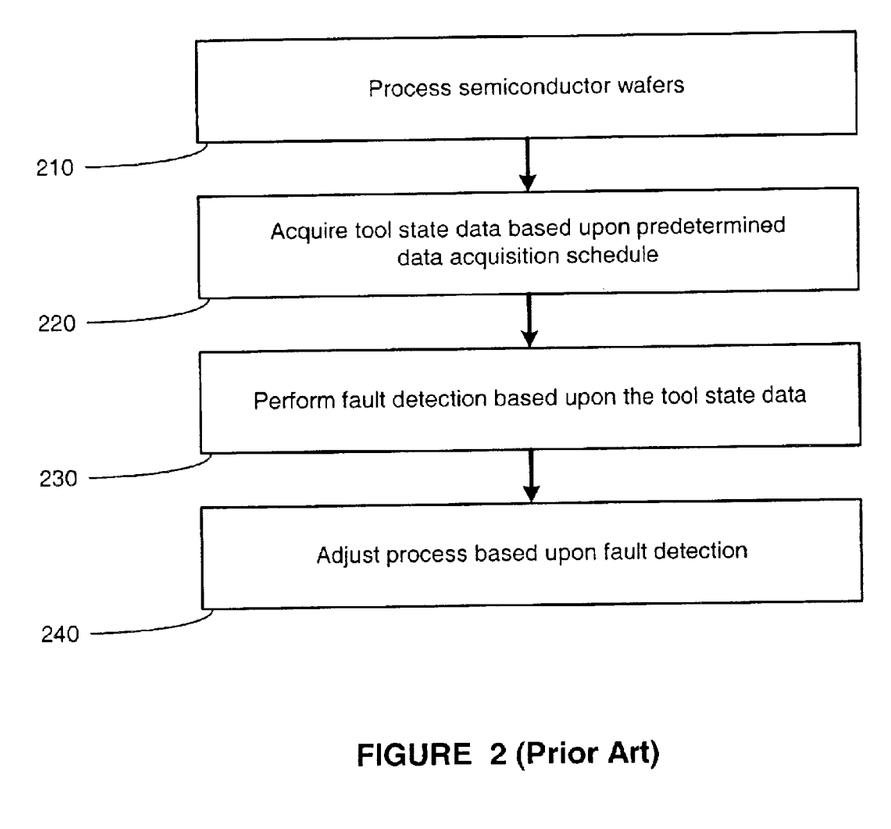
FIG. 2 illustrates a simplified flowchart depiction of a prior art process flow during manufacturing of semiconductor wafers.

Turning now to FIG. 2, a flow chart depiction of a prior art process flow is illustrated. A manufacturing system processes semiconductor wafers 105 in a batch/lot (block 210). Upon processing of semiconductor wafers 105, the manufacturing system may generally acquire tool state data relating to the processing tools that were used to perform the processes (block 220). The tool state data may be acquired using a data acquisition schedule that is determined prior to processing the semiconductor wafers 105. For example, a predetermined data rate for acquiring tool state data relating to processing of semiconductor wafers 105 may be employed in the acquisition of tool state data. Based upon the acquired data, the manufacturing system may perform fault detection analysis (block 230). Based upon the fault detection analysis, the manufacturing system may adjust the operation of one or more processing tools based upon the corrections deemed required to reduce faults (block 240).

One problem associated with employing the current methodology includes the fact that generally, a common predetermined data rate is used to acquire tool state data relating to processing of semiconductor wafers 105. Utilizing a common data rate may provide tool state data that may not be tailored to particular process steps performed on the semiconductor wafers 105. For example, capturing useful tool state data relating to certain processes may require a different data acquisition rate as compared to other processes. Additionally, predetermined common data collection rates that are employed in current processing operations may not react adequately to changes that may occur in the process. Therefore, a lack of adjustability in acquiring tool state data may lead to inadequate acquisition of tool state data, which may result in inadequate or non-optimal fault detection analysis. This may lead to processing errors that may result in inferior semiconductor wafers 105.

The present invention is directed to overcoming, or at least reducing, the effects of, one or more of the problems set forth above.

SUMMARY OF THE INVENTION

In one aspect of the present invention, a method is provided for adjusting a rate of data flow based upon a tool state. A processing step is performed on a workpiece using a processing tool. A dynamic data rate adjustment process is performed to determine a data rate for acquiring data relating to the process performed upon the workpiece. The dynamic data rate adjustment process includes adjusting the data rate based upon an operation parameter relating to the processing tool.

In another aspect of the present invention, a method is provided for adjusting a rate of data flow based upon a tool state. A processing step is performed on a workpiece using a processing tool. The data rate for acquiring tool state data is dynamically adjusted. The data rate is dynamically adjusted based upon a fault data, a recipe data, or a process step data relating to an operation of the processing tool.

In another aspect of the present invention, a system is provided for adjusting a rate of data flow based upon a tool state. The system includes a processing tool to process a workpiece. The system also includes a process controller operatively coupled to the processing tool. The process controller is capable of performing a dynamic data rate adjustment process to determine a data rate for acquiring data relating to performing a process upon the workpiece. The dynamic data rate adjustment process includes adjusting the data rate based upon an operation parameter relating to the processing tool.

In another aspect of the present invention, an apparatus is provided for adjusting a rate of data flow based upon a tool state. The apparatus includes a process controller adapted to perform a dynamic data rate adjustment process to determine a data rate for acquiring data relating to performing a process upon the workpiece using a processing tool. The dynamic data rate adjustment process includes adjusting the data based upon an operation parameter relating to the processing tool.

In yet another aspect of the present invention, a computer readable program storage device encoded with instructions is provided for adjusting a rate of data flow based upon a tool state. The computer readable program storage device encoded with instructions that, when executed by a computer, performs a method, which comprises: performing a process step upon a workpiece; performing a process step upon a workpiece using a processing tool; and performing a dynamic data rate adjustment process to determine a data rate for acquiring data relating to performing a process upon the workpiece. The dynamic data rate adjustment process includes adjusting the data rate based upon an operation parameter relating to the processing tool.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discrete processes that are involved in semiconductor manufacturing. Many times, workpieces (e.g., semiconductor wafers 105, semiconductor devices, etc.) are stepped through multiple manufacturing process tools. Embodiments of the present invention provide for performing a dynamic data rate adjustment relating to acquiring tool state data. Utilizing embodiments of the present invention data rate may be adjusted in reaction to implementation of certain process steps and/or changes that occur during the processing of semiconductor wafers 105. Therefore, different data rates can be employed in collecting tool state data for different processing steps and/or recipes that are implemented during processing of semiconductor wafers 105. Additionally, embodiments of the present invention may be used to dynamically adjust data rates based upon a deviation of a tool state from a predetermined operation mode. Therefore, a more accurate reaction in acquiring tool state data may be implemented such that more accurate correction and fault detection analysis may be performed during processing of semiconductor wafers 105.

Figure 3:
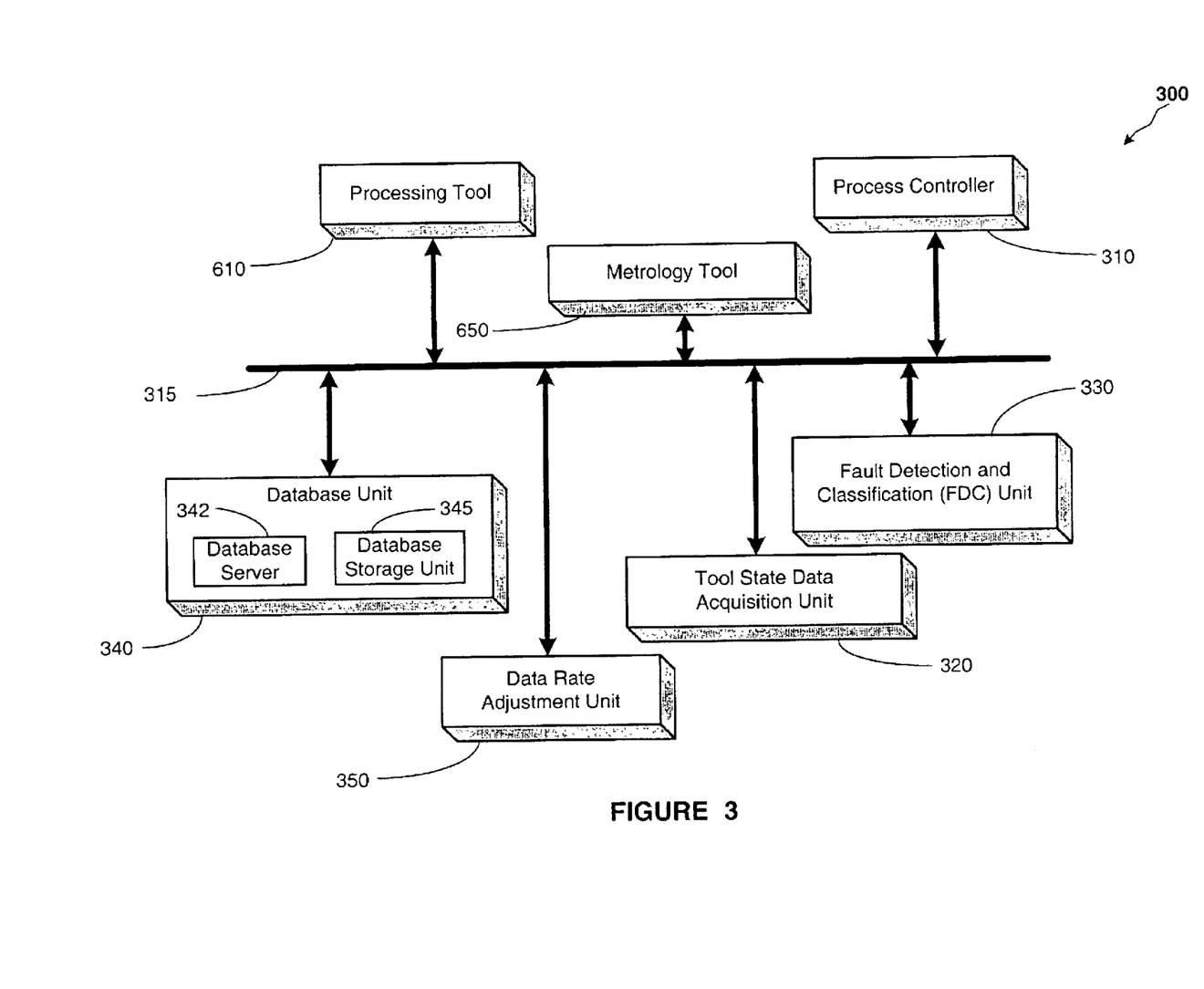
FIG. 3 provides a block diagram representation of a system in accordance with one illustrative embodiment of the present invention.

Turning now to FIG. 3, a block diagram depiction of a system 300 in accordance with embodiments of the present invention is illustrated. A process controller 310 in the system 300 is capable of controlling various operations relating to a processing tool 610. The system 300 is capable of acquiring manufacturing related data, such as metrology data related to processed semiconductor wafers 105, tool state data, and the like. The system 300 may also comprise a metrology tool 650 to acquire metrology data related to the processed semiconductor wafers 105.

The system 300 may also comprise a database unit 340. The database unit 340 is provided for storing a plurality of types of data, such as manufacturing-related data, data related to the operation of the system 300 (e.g., the status of the processing tool 610, the status of semiconductor wafers 105, etc.). The database unit 340 may store tool state data relating to a plurality of process runs performed by the processing tool 610. The database unit 340 may comprise a database server 342 for storing tool state data and/or other manufacturing data related to processing semiconductor wafers 105 into a database storage unit 345.

The system 300 may also comprise a tool state data acquisition unit 320 for acquiring tool state data. The tool state data may include pressure data, temperature data, humidity data, gas flow data, various electrical data, and the like, related to operations of the processing tool 610. Exemplary tool state data for an etch tool may include gas flow, chamber pressure, chamber temperature, voltage, reflected power, backside helium pressure, RF tuning parameters, etc. Tool state data may also include data external to the processing tool 610, such as ambient temperature, humidity, pressure, etc. A more detailed illustration and description of the tool state data acquisition unit 320 is provided in FIG. 4 and accompanying description below.

The system 300 also comprises a fault detection and classification unit (FDC) 330 capable of performing various fault detection analyses relating to the processing of semiconductor wafers 105. The fault detection and classification unit 330 is capable of providing data relating to faults during processing of semiconductor wafer 105. Fault detection analysis performed by the fault detection and classification unit 330 may include analysis of tool state data and/or metrology data. The FDC unit 330 may correlate particular tool state data to errors detected on the processed semiconductor wafer 105 by analyzing the metrology tool data. For example, particular errors, such as critical dimension errors discovered on the processed semiconductor wafers 105 may be correlated to particular gas flow rates or temperature data relating to tool state data. The fault detection performed by the FDC unit 330 may also include analyzing data from in situ sensors integrated into the processing tools 610.

The system 300 may also comprise a data rate adjustment unit 350. The data rate adjustment unit 350 is capable of performing adjustments to the data rate, which may be used to acquire tool state data. For example, the data rate adjustment unit 350 may receive fault detection data from the fault detection and classification unit 330 and perform adjustments to the data rate, which is used to collect tool state data. The data rate adjustment unit 350 may provide the tool state data acquisition unit 320 with information relating to the data rate and adjust the rate of data acquisition of tool state data. The data rate adjustment unit 350 may adjust the data acquisition rate based upon many factors, such as the type of process steps being performed, the type of recipe being implemented during the processing of semiconductor wafers 105, the detection of faults and/or deviation from normal operation by the processing tools 610, and/or other factors deemed relevant by those skilled in the art having benefit of the present disclosure. A more detailed block diagram illustration of the data rate adjustment unit 350 is provided in FIG. 5 and accompanying description below.

The process controller 310, the FDC unit 330, and/or the data rate adjustment unit 350 may be software, hardware, or firmware units that are standalone units or may be integrated into a computer system associated with the system 300. Furthermore, the various components represented by the blocks illustrated in FIG. 3 may communicate with one another via a system communications line 315. The system communications line 315 may be a computer bus link, a dedicated hardware communications link, a telephone system communications link, a wireless communications link, or other communication links that may be implemented by those skilled in the art having benefit of the present disclosure.

Figure 4:
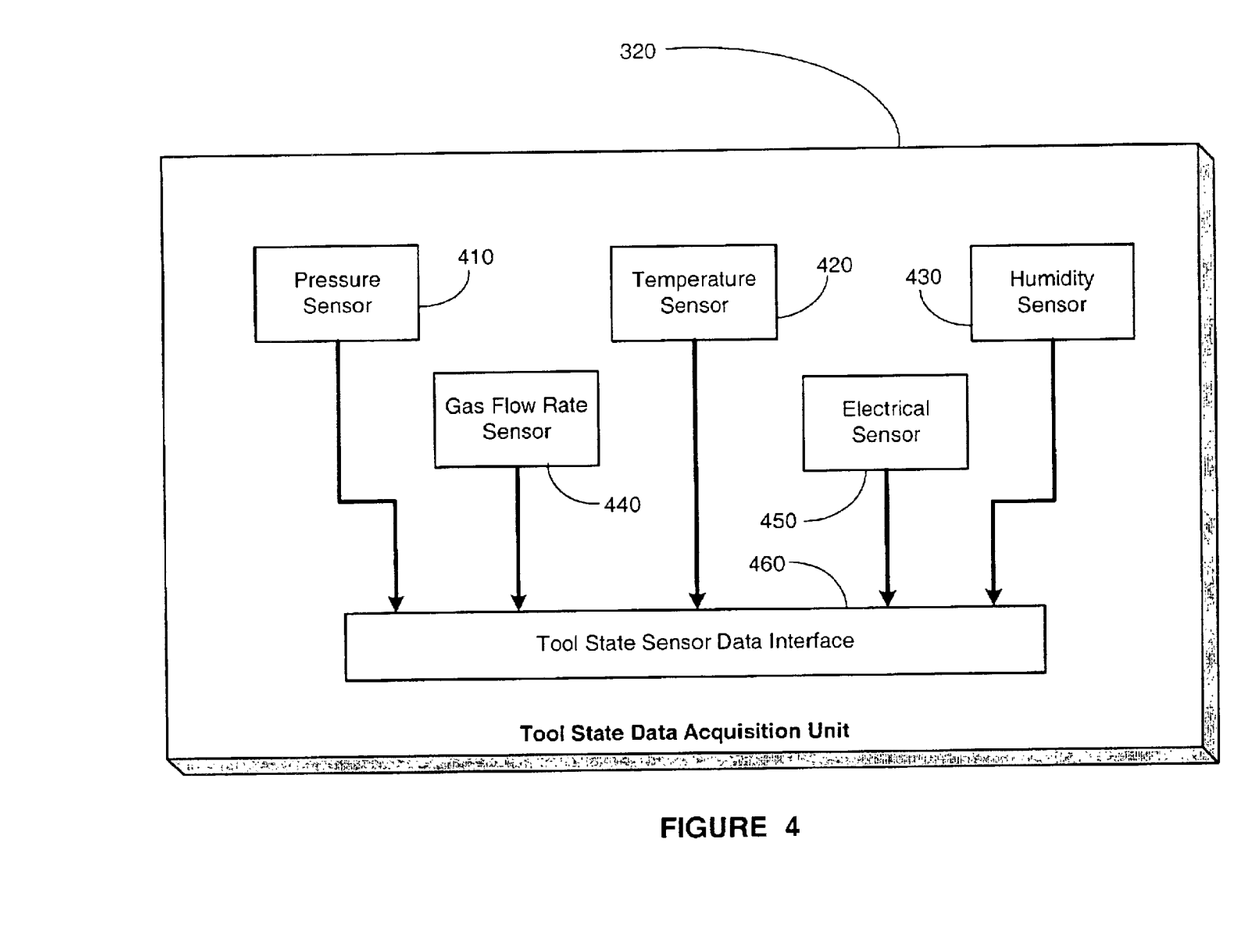
FIG. 4 illustrates a more detailed block diagram representation of a tool state data acquisition unit of FIG. 3, in accordance with one illustrative embodiment of the present invention.

Turning now to FIG. 4, a more detailed block diagram depiction of the tool state data acquisition unit 320 illustrated in FIG. 3 is provided. The tool state data acquisition unit 320 may comprise any of a variety of different types of sensors, e.g., a pressure sensor 410, a temperature sensor 420, a humidity sensor 430, a gas flow rate sensor 440, and an electrical sensor 450, etc. In an alternative embodiment, the tool state data acquisition unit 320 may comprise in situ sensors that are integrated into the processing tool 610. The pressure sensor 410 is capable of detecting the pressure within the processing tool 610. The temperature sensor 420 is capable of sensing the temperature of various portions of the processing tool 610. The humidity sensor 430 is capable of detecting the relative humidity at various portions in the processing tool 610, or of the surrounding ambient conditions. The gas flow rate sensor 440 may comprise a plurality of flow-rate sensors that are capable of detecting the flow-rate of a plurality of process gases utilized during processing of semiconductor wafers 105. For example, the gas flow rate sensor 440 may comprise sensors that can detect the flow rate of gases such as $NH_3$, $SiH_4$, $N_2$, $N_2O$, and/or other process gases.

In one embodiment, the electrical sensor 450 is capable of detecting a plurality of electrical parameters, such as the current provided to a lamp used in a photolithography process. The tool state data acquisition unit 320 may also comprise other sensors capable of detecting a variety of manufacturing variables known to those skilled in the art having benefit of the present disclosure. The tool state data acquisition unit 320 may also comprise a tool state sensor data interface 460. The tool state sensor data interface 460 may receive sensor data from the various sensors that are contained within, or associated with, the processing tool 610 and/or the tool state data acquisition unit 320 and transmit the data to the process controller 310.

Figure 5:
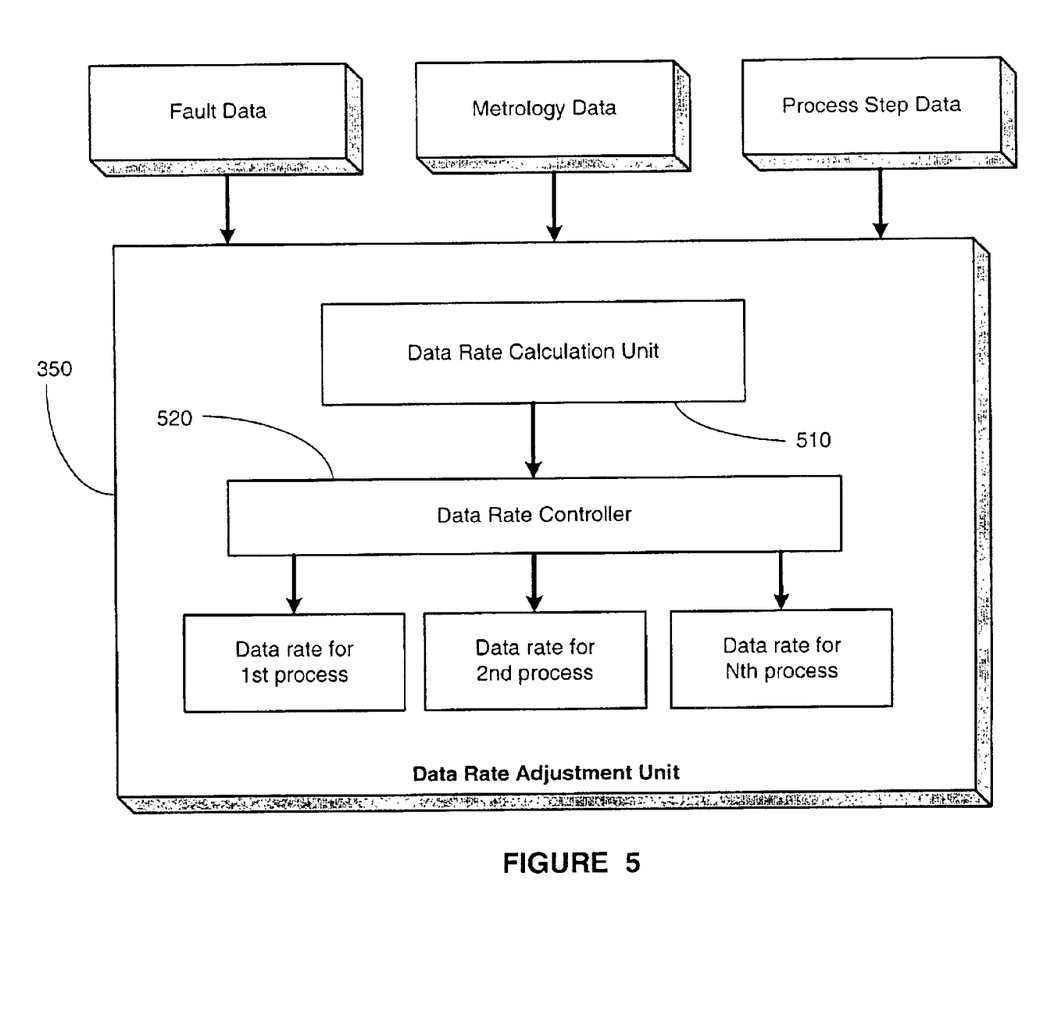
FIG. 5 illustrates a more detailed block diagram representation of a data rate adjustment unit of FIG. 3, in accordance with one illustrative embodiment of the present invention.

Turning now to FIG. 5, a more detailed block diagram of the data rate adjustment unit 350 in accordance with one embodiment of the present invention is illustrated. The data rate adjustment unit 350 may comprise a data rate calculation unit 510 and a data rate controller 520. The data rate adjustment unit 350 may receive fault data, recipe data that provides indications of the type of recipes being implemented during processing of semiconductor wafers 105, and/or process step data, which may relate to the type of process step being implemented. Utilizing one or more of the fault data, the recipe data, and/or the process step data, a data rate calculation unit 510 may perform a calculation to determine an appropriate data rate to be implemented by the tool state data acquisition unit 320 to acquire tool state data. For example, the data rate calculation unit 510 may adjust the data acquisition rate based upon the type of fault data received. A specific type of fault data that is received may provide an indication that an adjustment of the data acquisition rate is desirable.

The data rate calculation unit 510 may also adjust the data rate based upon the type of recipe being implemented into a process and/or the type of process step being performed. Based upon the calculation(s) provided by the data rate calculation unit 510, the data rate controller 520 may provide one or more signals that may be used to control the data rate to be implemented for acquisition of tool state data. The data rate controller 520 may provide a first data rate for a first process step, which may be different from a second data rate for a second process step, and an $N^{th}$ data rate for an $N^{th}$ process step. For example, the data rate for a first process step may be based upon fault data whereas the data rate for the second process step may be based upon the type of recipe that is being implemented, and the data rate for the $N^{th}$ process step may relate to a specific process step being implemented by the processing tool 610. Utilizing the data rate adjustment unit 350, the tool state data acquisition unit 320 may acquire tool state data at different rates, which is more tailored to specific situations in the process system 300. Therefore, more reactive adjustments may be made to processing tools 610 resulting from an appropriate amount of data that is acquired due to the adjustment of the data rate performed by the data rate adjustment unit 350.

Figure 6:
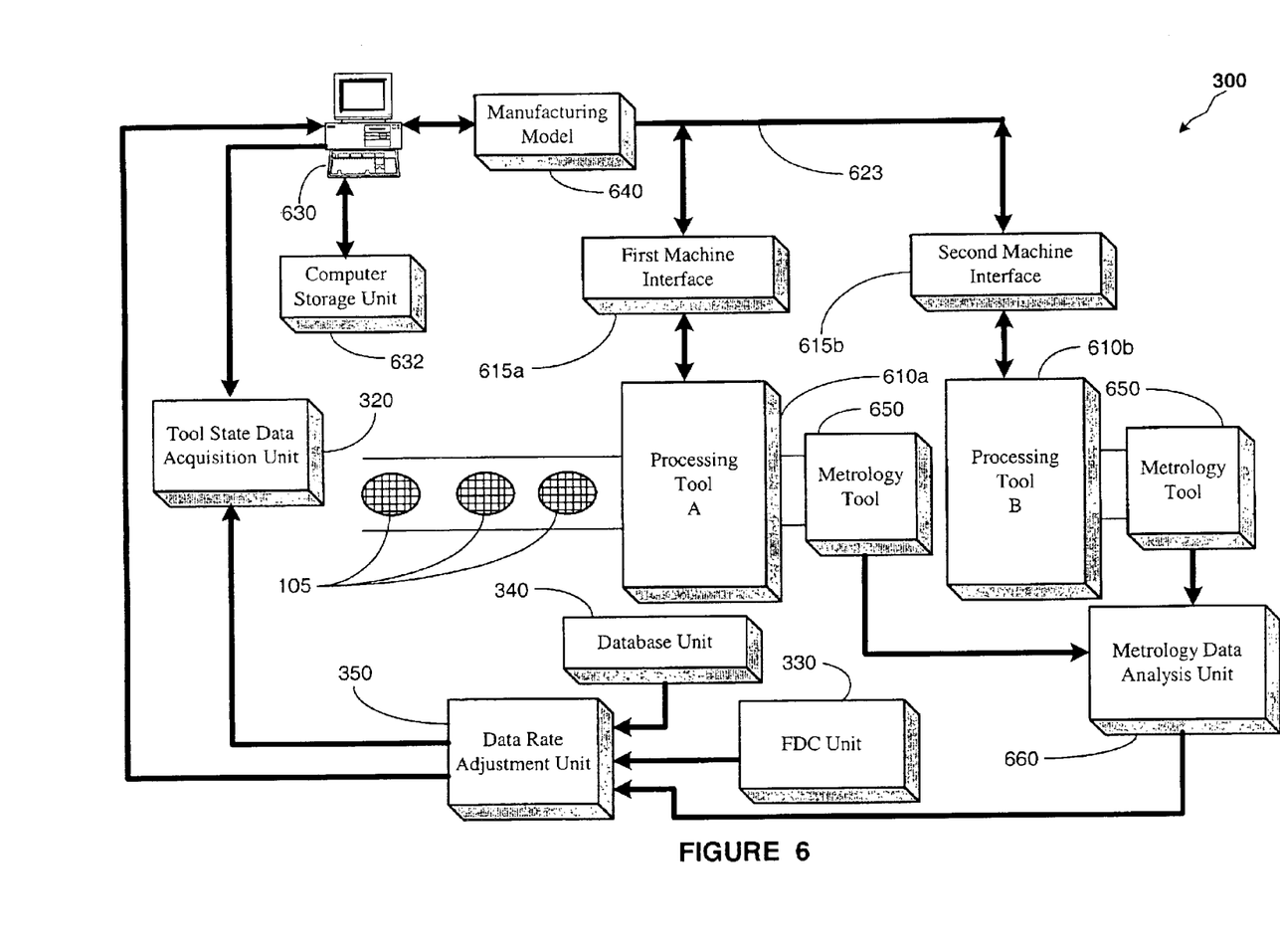
FIG. 6 illustrates a more detailed block diagram representation of the system shown in FIG. 3, in accordance with one illustrative embodiment of the present invention.

Turning now to FIG. 6, a more detailed block diagram of the system 300 in accordance with one embodiment of the present invention is illustrated. Semiconductor wafers 105 are processed on processing tools 610a, 610b using a plurality of control input signals, or manufacturing parameters, provided via a line or network 623. The control input signals, or manufacturing parameters, on the line 623 are sent to the processing tools 610a, 610b from a computer system 630 via machine interfaces 615a, 615b. The first and second machine interfaces 615a, 615b are generally located outside the processing tools 610a, 610b. In an alternative embodiment, the first and second machine interfaces 615a, 615b are located within the processing tools 610a, 610b. The semiconductor wafers 105 are provided to and carried from a plurality of processing tools 610. In one embodiment, semiconductor wafers 105 may be provided to a processing tool 610 manually. In an alternative embodiment, semiconductor wafers 105 may be provided to a processing tool 610 in an automatic fashion (e.g., robotic movement of semiconductor, wafers 105). In one embodiment, a plurality of semiconductor wafers 105 is transported in lots (e.g., stacked in cassettes) to the processing tools 610.

In one embodiment, the computer system 630 sends control input signals, or manufacturing parameters, on the line 623 to the first and second machine interfaces 615a, 615b. The computer system 630 is capable of controlling processing operations. In one embodiment, the computer system 630 is a process controller. The computer system 630 is coupled to a computer storage unit 632 that may contain a plurality of software programs and data sets. The computer system 630 may contain one or more processors (not shown) that are capable of performing the operations described herein. The computer system 630 employs a manufacturing model 640 to generate control input signals on the line 623. In one embodiment, the manufacturing model 640 contains a manufacturing recipe that determines a plurality of control input parameters that are sent on the line 623 to the processing tools 610a, 610b.

In one embodiment, the manufacturing model 640 defines a process script and input control that implement a particular manufacturing process. The control input signals (or control input parameters) on the line 623 that are intended for processing tool A 610a are received and processed by the first machine interface 615a. The control input signals on the line 623 that are intended for processing tool B 610b are received and processed by the second machine interface 615b. Examples of the processing tools 610a, 610b used in semiconductor manufacturing processes are steppers, etch process tools, deposition tools, and the like.

One or more of the semiconductor wafers 105 that are processed by the processing tools 610a, 610b can also be sent to a metrology tool 650 for acquisition of metrology data. The metrology tool 650 may be a scatterometry data acquisition tool, an overlay-error measurement tool, a critical dimension measurement tool, and the like. In one embodiment, a metrology tool 650 examines one or more processed semiconductor wafers 105. The metrology data analysis unit 660 may collect, organize, and analyze data from the metrology tool 650. The metrology data is directed to a variety of physical or electrical characteristics of the devices formed across the semiconductor wafers 105. For example, metrology data may be obtained as to line width measurements, depth of trenches, sidewall angles, thickness, resistance, and the like. Metrology data may be used to determine faults that may be present across the processed semiconductor wafers 105, which may be used to quantify the performance of the processing tools 610.

As provided above, the data rate adjustment unit 350 may receive data from a plurality of sources, such the metrology data analysis unit 660, which may provide an indication of unusual drifts in the processing tool 610 as evidenced by metrology data. The data rate adjustment unit 350 may also receive data from the FDC unit 330 and/or the database unit 340. The data rate adjustment unit 350 may adjust the data acquisition rate of the tool state data based upon any faults detected, any adjustments to recipes and/or to process steps, which may be provided by the database unit 340. The data rate adjustment unit 350 may send data rate information to the tool state data acquisition unit 320 to influence the operation of the tool state data acquisition unit 320 in acquiring tool state data. In an alternative embodiment, the data rate adjustment unit 350 may send data rate information to the computer system 630, which may implement a specific data rate for the acquisition of tool state data by directly affecting the operation of the various sensors associated with the tool state data acquisition unit 320.

Figure 7:
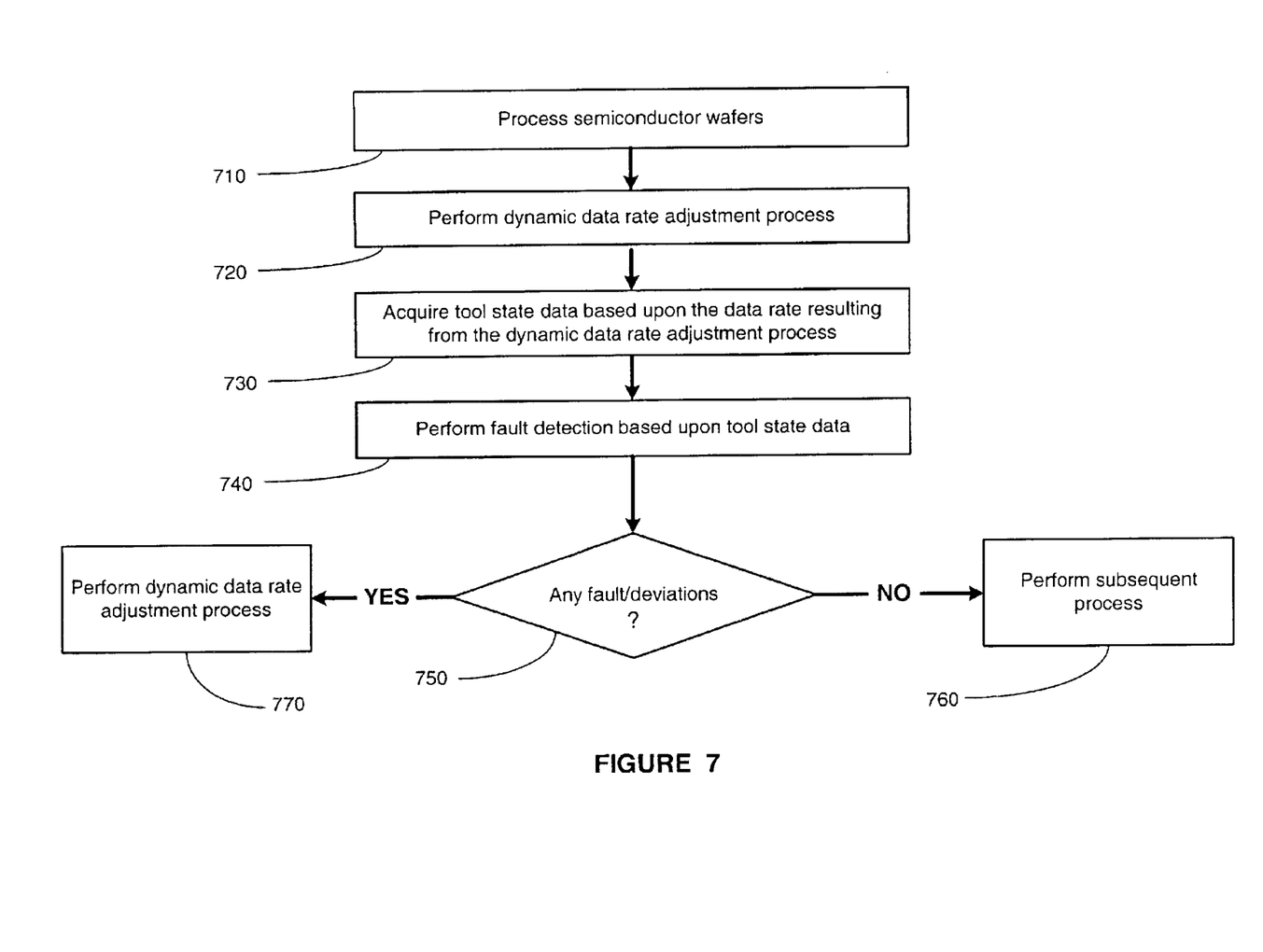
FIG. 7 illustrates a flowchart depiction of a method in accordance with one illustrative embodiment of the present invention.

Turning now to FIG. 7, a flow chart depiction of the methods in accordance with embodiments of the present invention is illustrated. The system 300 may process semiconductor wafers 105 associated with a batch/lot (block 710). Upon processing, the system 300 may perform a dynamic data rate adjustment process to adjust the rate of acquisition of tool state data (block 720). The dynamic data rate adjustment process is used to provide dynamically adjusted data rates for acquisition of tool state data. The dynamically adjusted data rates may be tailored for specific recipes, processes, and/or fault/deviations relating to the processing of semiconductor wafers 105. A more detailed illustration and description of the dynamic data rate adjustment process is provided in FIG. 8 and accompanying description below.

Upon performing the dynamic data rate adjustment process, the system 300 may acquire tool state data relating to processing of semiconductor wafers 105 (block 730). The tool state data may include pressure data, gas flow rate data, temperature data, humidity data, and/or other tool state parameters. Specific tool state data may be acquired by data rates specified by the dynamic data rate adjustment process. The system 300 may then perform a fault detection and classification process based upon the acquisition of tool state data (block 740). Metrology data and/or other manufacturing data may also be used to perform the fault detection and classification process. The fault detection and classification process may provide insight to faults during the processing of semiconductor wafers 105 and/or deviation of the operation of the processing tool 610.

The system 300 may then determine whether significant fault(s) and/or deviation(s) in the operation of the processing tool 610 exist (block 750). When the system 300 determines that no significant faults and/or deviations exist, the system 300 continues performing subsequent processing of semiconductor wafers 105 (block 760). If the system 300 determines that faults and/or deviations in the operation of processing tools 610 exist, in response, the system 300 may perform the dynamic data rate adjustment process (block 770). Depending upon the particular faults detected, the dynamic data rate adjustment process may adjust the data rate, such as increasing the data rate to acquire a larger sample of tool state data. Therefore, in response to faults or deviations, the acquisition of the data rate may be "throttled up" such that more data is acquired for more accurate assessment and correction of the operation of the processing tools 610.

Figure 8:
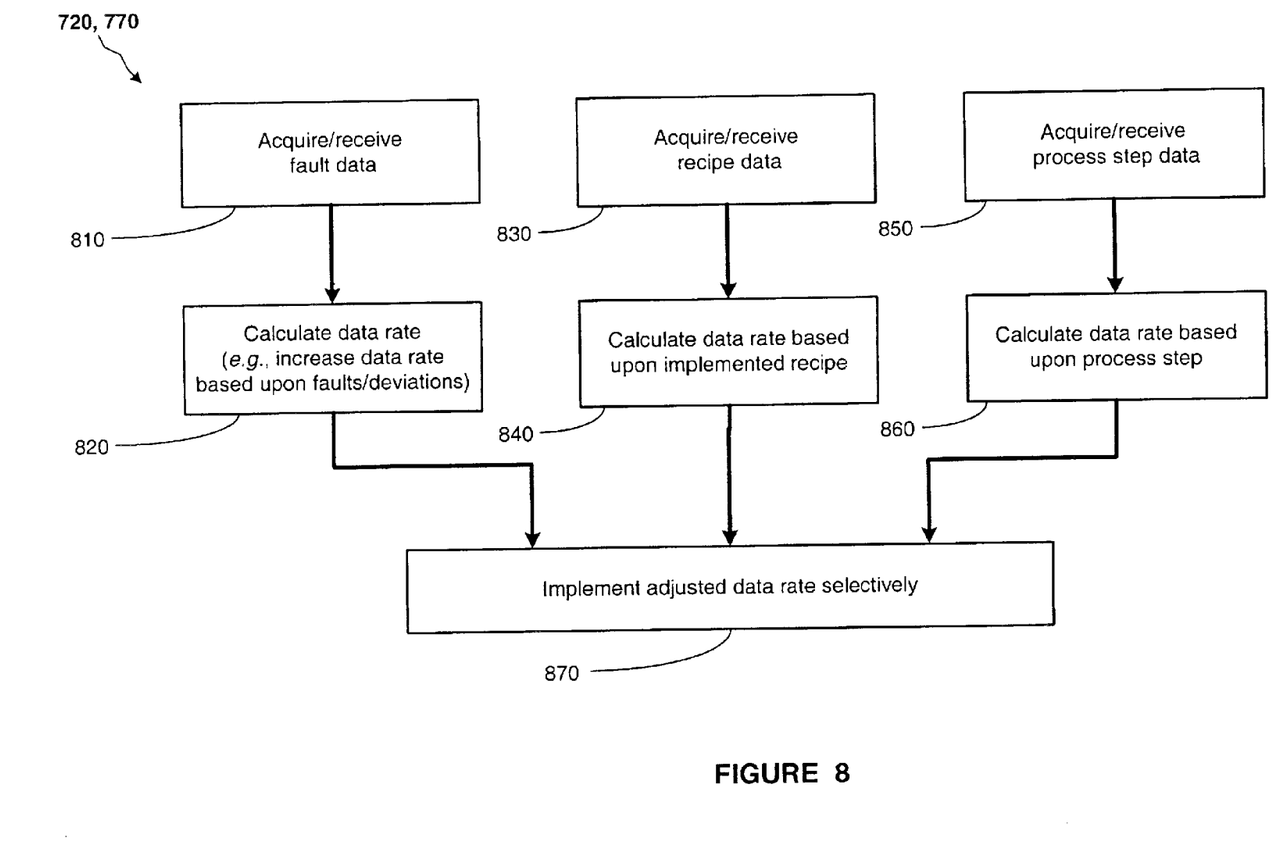
FIG. 8 illustrates a more detailed flowchart depiction of a method of performing a dynamic data rate adjustment process, as indicated in FIG. 7, in accordance with one illustrative embodiment of the present invention.

Turning now to FIG. 8, a more detailed flowchart of the dynamic data rate adjustment process, as indicated in blocks 720 and 770 of FIG. 7, is illustrated. The system 300 may receive fault data (block 810), e.g., fault data from the FDC unit 330. The fault data may be generated using tool state data and/or metrology data. The system 300 may then perform calculation(s) to determine appropriate data rates to be used to acquire tool state data based upon the fault data (block 820). Based upon the fault data, the system 300 may calculate an increased data rate based upon faults and/or deviations relating to the operation of the processing tools 610. Increased data rate(s) may result in more data points that are acquired, therefore, more accurate assessments of the operation of the processing tools 610 may be performed.

Similarly, the system 300 may receive recipe data that indicates which types of recipes are to be implemented during the processing of semiconductor wafers 105 (block 830). Based upon the particular recipe being implemented, the system 300 may calculate appropriate data rates to tailor the acquisition of tool state data to the appropriate recipes (block 840). The system 300 may also acquire process step data (block 850) that may provide an indication of the types of process steps that are being performed, for example, the types of process steps being implemented as a result of particular recipes. The system 300 may then calculate particular data rates for acquisition of tool state data based upon the particular types of process steps being implemented (block 860). The data rates may be directed towards acquiring certain types of tool state data at particular data rates. For example, for certain processes, the pressure data may be more important, and therefore, an increase in the acquisition of the pressure data may be implemented as a result of a particular process step being implemented. Upon calculation of the data rate as a result of faults/deviations, recipes being implemented, and/or process steps being performed, the system 300 implements the adjusted data rate such that the tool state data acquisition unit 320 is able to selectively implement the adjusted data rate (block 870). Completion of the steps described in FIG. 8 substantially completes the process of performing the dynamic data rate adjustment process described in blocks 720 and 770 of FIG. 7.

Utilizing embodiments of the present invention, a dynamic adjustment may be made to a data rate which may be used to acquire tool state data. Adjustments to the data rate used to acquire other types of data relating to processing of semiconductor wafers may be implemented utilizing embodiments of the present invention. The data rate may be adjusted based upon the types of recipes that are implemented, the process step that is implemented and/or any faults or deviations by the operation of the processing tools 610. Therefore, changes in recipes due to feedback and/or feed forward corrections may cause the system 300 to adjust the data rate acquiring tool state data appropriately. The adjustments to the processing of semiconductor wafers 105 may be followed by an adjustment to the data rate of acquiring tool state data, thereby allowing for more customized and tailored acquisition of tool state data to particular recipes, process steps, and/or to fault/deviations relating to the operation of the system 300. Therefore, utilizing embodiments of the present invention, the dynamic data rate adjustment process may be used to more accurately assess tool states and react to changing recipes, process steps and/or faults during the processing of semiconductor wafers 105 in acquiring and assessing tool state.

The principles taught by the present invention can be implemented in an Advanced Process Control (APC) Framework, such as a Catalyst system offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

performing a process step upon a workpiece using a processing tool; and performing a dynamic data rate adjustment process to determine a data rate for acquiring data relating to performing the process step upon said workpiece, said dynamic data rate adjustment process comprising adjusting said data rate based upon an operation parameter relating to said processing tool.

2. The method of claim 1, wherein performing said process step upon said workpieces further comprises performing said process step upon a semiconductor wafer.

3. The method of claim 1, wherein performing said dynamic data rate adjustment process further comprises adjusting said data rate based upon at least one of a fault data, a recipe data, and a process step data.

4. The method of claim 3, wherein adjusting said data rate based upon said fault data further comprises increasing said data rate based upon said fault data.

5. The method of claim 1, wherein performing said dynamic data rate adjustment process further comprises increasing said data rate based upon a deviation of operation of said processing tool.

6. The method of claim 1, wherein performing said dynamic data rate adjustment process further comprises adjusting a data acquisition rate for acquiring tool state data.

7. The method of claim 6, wherein acquiring said tool state data further comprises acquiring at least one of a pressure data, a temperature data, a humidity data, and a gas flow rate data relating to said process step performed upon said workpiece.

8. The method of claim 1, further comprising performing a fault detection analysis relating to an operation of said processing tool.

9. The method of claim 8, further comprising performing said dynamic data rate adjustment process based upon said fault detection analysis.

10. A method, comprising:
performing a process step upon a workpiece using a processing tool; and
adjusting dynamically a data rate for acquiring tool state data based upon at least one of a fault data, a recipe data, and a process step data relating to an operation of said processing tool.

11. The method of claim 10, wherein performing said process step upon said workpieces further comprises performing said process step upon a semiconductor wafer.

12. The method of claim 10, wherein adjusting dynamically said data rate further comprises increasing said data rate based upon a deviation of operation of said processing tool.

13. The method of claim 10, wherein acquiring said tool state data further comprises acquiring at least one of a pressure data, a temperature data, a humidity data, and a gas flow rate data relating to said process step performed upon said workpiece.

14. An apparatus, comprising:
means for performing a process step upon a workpiece using a processing tool; and
means for performing a dynamic data rate adjustment process to determine a data rate for acquiring data relating to said performing a process upon said workpiece, said dynamic data rate adjustment process comprising adjusting said data rate based upon an operation parameter relating to said processing tool.

15. A system, comprising:
a processing tool to process a workpiece; and
a process controller operatively coupled to said processing tool, said process controller to perform a dynamic data rate adjustment process to determine a data rate for acquiring data relating to said performing a process upon said workpiece, said dynamic data rate adjustment process comprising adjusting said data rate based upon an operation parameter relating to said processing tool.

16. The system of claim 15, wherein said workpiece is a semiconductor wafer.

17. The system of claim 15, further comprising:
a tool state data acquisition unit operatively coupled to said process controller and to said processing tool, said tool state data acquisition unit to acquire tool state data relating to an operation performed by said processing tool;
a metrology tool operatively coupled to said process controller and to said processing tool, said metrology tool to acquire metrology data relating to said processed workpiece;
a fault detection and classification (FDC) unit operatively coupled to said process controller, said fault detection and classification unit to perform said fault detection process; and
a data rate adjustment unit operatively coupled to said process controller and to said tool state data acquisition unit, said data rate adjustment unit to adjust said data rate used by said tool state data acquisition unit to acquire tool state data.

18. The system of claim 17, further comprising a database unit to store said at least one of metrology data, said tool state data, and said electrical test data.

19. The system of claim 17, wherein said tool state data acquisition unit comprises at least one of a pressure sensor, gas flow sensor, temperature sensor, humidity sensor, and an electrical sensor.

20. An apparatus, comprising:
a process controller capable of performing a dynamic data rate adjustment process to determine a data rate for acquiring data relating to performing a process upon a workpiece using a processing tool, said dynamic data rate adjustment process comprising adjusting said data rate based upon an operation parameter relating to said processing tool.

21. The apparatus of claim 20, wherein said workpiece is a semiconductor wafer.

22. The apparatus of claim 20, further comprising:
a tool state data acquisition unit operatively coupled to said process controller and to said processing tool, said tool state data acquisition unit to acquire tool state data relating to an operation performed by said processing tool;
a metrology tool operatively coupled to said process controller and to said processing tool, said metrology tool to acquire metrology data relating to said processed workpiece;
a fault detection and classification (FDC) unit operatively coupled to said process controller, said fault detection and classification unit to perform said fault detection process; and
a data rate adjustment unit operatively coupled to said process controller and to said tool state data acquisition unit, said data rate adjustment unit to adjust said data rate used by said tool state data acquisition unit to acquire tool state data.

23. The apparatus of claim 22, wherein said tool state data acquisition unit comprises at least one of a pressure sensor, gas flow sensor, temperature sensor, humidity sensor, and an electrical sensor.

24. A computer readable program storage device encoded with instructions that, when executed by a computer, performs a method, comprising:
performing a process step upon a workpiece using a processing tool; and
performing a dynamic data rate adjustment process to determine a data rate for acquiring data relating to said performing a process upon said workpiece, said dynamic data rate adjustment process comprising adjusting said data rate based upon an operation parameter relating to said processing tool.

25. The computer readable program storage device encoded with instructions that, when executed by a computer, performs the method of claim 24, wherein performing said process step upon said workpieces further comprises performing said process step upon a semiconductor wafer.

26. The computer readable program storage device encoded with instructions that, when executed by a computer, performs the method of claim 24, wherein performing said dynamic data rate adjustment process further comprises adjusting said data rate based upon at least one of a fault data, a recipe data, and a process step data.

27. The computer readable program storage device encoded with instructions that, when executed by a computer, performs the method of claim 26, wherein adjusting said data rate based upon said fault data further comprises increasing said data rate based upon said fault data.

28. The computer readable program storage device encoded with instructions that, when executed by a computer, performs the method of claim 24, wherein performing said dynamic data rate adjustment process further comprises increasing said data rate based upon a deviation of operation of said processing tool.

29. The computer readable program storage device encoded with instructions that, when executed by a computer, performs the method of claim 24, wherein performing said dynamic data rate adjustment process further comprises adjusting a data acquisition rate for acquiring tool state data.

30. The computer readable program storage device encoded with instructions that, when executed by a computer, performs the method of claim 29, wherein acquiring said tool state data further comprises acquiring at least one of a pressure data, a temperature data, a humidity data, and a gas flow rate data relating to said process step performed upon said workpiece.

31. The computer readable program storage device encoded with instructions that, when executed by a computer, performs the method of claim 24, the method further comprising performing a fault detection analysis relating to an operation of said processing tool.

32. The computer readable program storage device encoded with instructions that, when executed by a computer, performs the method of claim 31, the method further comprising performing said dynamic data rate adjustment process based upon said fault detection analysis.

* * * * *